United States Patent
Im et al.

(10) Patent No.: US 9,930,550 B2
(45) Date of Patent: Mar. 27, 2018

(54) METHOD AND APPARATUS FOR CONTROLLING MODEM IN WIRELESS COMMUNICATION SYSTEM

(71) Applicants: Se-Bin Im, Gyeonggi-do (KR); Min-Goo Kim, Gyeonggi-do (KR); Sung-Soo Kim, Seoul (KR); Chae-Hag Yi, Gyeonggi-do (KR)

(72) Inventors: Se-Bin Im, Gyeonggi-do (KR); Min-Goo Kim, Gyeonggi-do (KR); Sung-Soo Kim, Seoul (KR); Chae-Hag Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 113 days.

(21) Appl. No.: 14/978,692

(22) Filed: Dec. 22, 2015

(65) Prior Publication Data

US 2016/0212756 A1    Jul. 21, 2016

Related U.S. Application Data

(60) Provisional application No. 62/103,874, filed on Jan. 15, 2015.

(30) Foreign Application Priority Data

Feb. 11, 2015  (KR) .................. 10-2015-0020825
Apr. 29, 2015  (KR) .................. 10-2015-0060776

(51) Int. Cl.
*H04L 1/00* (2006.01)
*H04W 24/08* (2009.01)
*H04W 72/12* (2009.01)

(52) U.S. Cl.
CPC ....... *H04W 24/08* (2013.01); *H04W 72/1247* (2013.01)

(58) Field of Classification Search
CPC ......... H04L 47/70; H04L 47/72; H04L 47/74; H04L 47/78; H04L 47/80; H04L 47/10; H04L 47/12; H04L 47/20; H04L 47/24; H04L 47/32; H04L 47/38; H04B 7/2121; H04B 7/2123; H04J 2203/0069; H04Q 2213/394; H04W 72/04
USPC ........ 370/230, 329; 709/203, 212, 226, 232; 455/500, 552.1
See application file for complete search history.

(56) References Cited

U.S. PATENT DOCUMENTS

2010/0144332 A1 * 6/2010 Savoor .............. H04W 72/1242
                                                                       455/418
2014/0029524 A1    1/2014 Dimou et al.

* cited by examiner

*Primary Examiner* — Dady Chery
(74) *Attorney, Agent, or Firm* — The Farrell Law Firm, P.C.

(57) ABSTRACT

A method and apparatus for controlling a modem of a user equipment (UE) in a wireless communication system is provided. The method includes generating at least one modem control information determined based on information related to a wireless communication environment, when at least a portion of the wireless communication environment is changed, updating a priority stored in a database of the UE based on the changed wireless communication environment and controlling the modem of the UE using the priority-updated modem control information.

15 Claims, 10 Drawing Sheets

800

| value | information |
|---|---|
| 0 | location |
| 1 | person |
| ... | |
| 10 | signal strength |
| 13 | signal-to-noise ratio (SNR) |
| 14 | signal-to-interference ratio (SIR) |
| ... | |
| 20 | maximum delayed path |
| 21 | Doppler frequency |
| 22 | initial time offset |
| 23 | initial frequency offset |
| 24 | channel state index |
| ... | |
| 30 | synchronizer control parameter 0 |
| 31 | synchronizer control parameter 1 |
| 32 | synchronizer control parameter 2 |
| ... | |
| 40 | channel estimator control parameter 0 |
| 41 | channel estimator control parameter 1 |
| 42 | channel estimator control parameter 2 |
| ... | |
| 50 | demodulator control parameter 0 |
| 51 | demodulator control parameter 1 |
| 52 | demodulator control parameter 2 |
| ... | |
| 60 | other control parameter 0 |
| 61 | other control parameter 1 |
| 62 | other control parameter 2 |
| ... | |

FIG.8

METHOD AND APPARATUS FOR CONTROLLING MODEM IN WIRELESS COMMUNICATION SYSTEM

PRIORITY

This application claims priority under 35 U.S.C. § 119(e) to a U.S. Provisional Patent Application filed on Jan. 15, 2015 in the U.S. Patent and Trademark Office and assigned Ser. No. 62/103,874, and under 35 U.S.C. § 119(a) to a Korean Patent Application filed on Feb. 11, 2015 in the Korean Intellectual Property Office and assigned Serial No. 10-2015-0020825, and to a Korean Patent Application filed on Apr. 29, 2015 in the Korean Intellectual Property Office and assigned Serial No. 10-2015-0060776, the entire disclosure of each of which are incorporated herein by reference.

BACKGROUND

1. Field of the Disclosure

The present disclosure relates generally to a method and an apparatus for controlling a modem in a wireless communication system, and more particularly, to a method and an apparatus for enhancing performance of a transmitter and receiver of a modem in a wireless communication system.

2. Description of the Related Art

As mobile communication industries expand, next-generation wireless communication systems enabling high-speed data and video services, as well as voice services are attracting attention, and standardization of the same is in progress.

A wireless communication system measures and collects information in wireless communication environments to control an operation of modems of mobile terminals. For example, a wireless communication system consecutively performs cell search and measurement of signal quality for neighboring base stations in a coverage area to select a base station with the best reception performance continuously.

A conventional modem obtains information required to control a transmission/reception operation by the same method. The time delay that occurs due to repetitive operations and the reliability of measurement information affect the performance of a modem.

Accordingly, there is a need for a scheme for enhancing the performance of a transmitter/receiver of a modem.

SUMMARY

The present disclosure provides an apparatus and method for enhancing the performance of a transmitter and receiver of a modem in a wireless communication system.

The present disclosure provides an apparatus and method for enhancing the performance of a transmitter and receiver of a modem in a wireless communication system, based on a database.

The present disclosure increases the reliability of measurement information in a wireless communication system and enhances the transmission/reception performance of a UE.

The present disclosure reduces time delay that may occur due to repetitive operations and the time of access to a base station in a wireless communication system.

In accordance with an aspect of the present disclosure, a method for controlling a modem of a user equipment (UE) in a wireless communication system comprises generating at least one modem control information determined based on information related to a wireless communication environment, when at least a portion of the wireless communication environment is changed, updating a priority stored in a database of the UE based on the changed wireless communication environment, and controlling the modem of the UE using the priority-updated modem control information.

In accordance with an aspect of the present disclosure, a method for controlling a modem of a user equipment (UE) in a wireless communication system comprises transmitting information related to a wireless communication environment changed for the UE to a central management server, receiving modem control information corresponding to a priority updated according to the change in the wireless communication environment from the central management server, and controlling the modem of the UE using the updated modem control information, wherein the received, priority-updated modem control information is, when at least a portion of the wireless communication environment is changed, priority-updated information according to the changed wireless communication environment.

In accordance with an aspect of the present disclosure, an apparatus for controlling a modem of a user equipment (UE) in a wireless communication system comprises a transceiver transmitting information related to a wireless communication environment changed for the UE to a central management server and receiving modem control information corresponding to a priority updated according to the change in the wireless communication environment from the central management server and a processor controlling the modem of the UE using the updated modem control information, wherein the received, priority-updated modem control information is, when at least a portion of the wireless communication environment is changed, priority-updated information according to the changed wireless communication environment.

BRIEF DESCRIPTION OF THE DRAWINGS

The above and other aspects, features, and advantages of the present disclosure will be more apparent from the following detailed description, taken in conjunction with the accompanying drawings, in which:

FIG. 8 is an illustration of a database according to an embodiment of the present disclosure;

DETAILED DESCRIPTION OF EMBODIMENTS OF THE PRESENT DISCLOSURE

Figure 1:
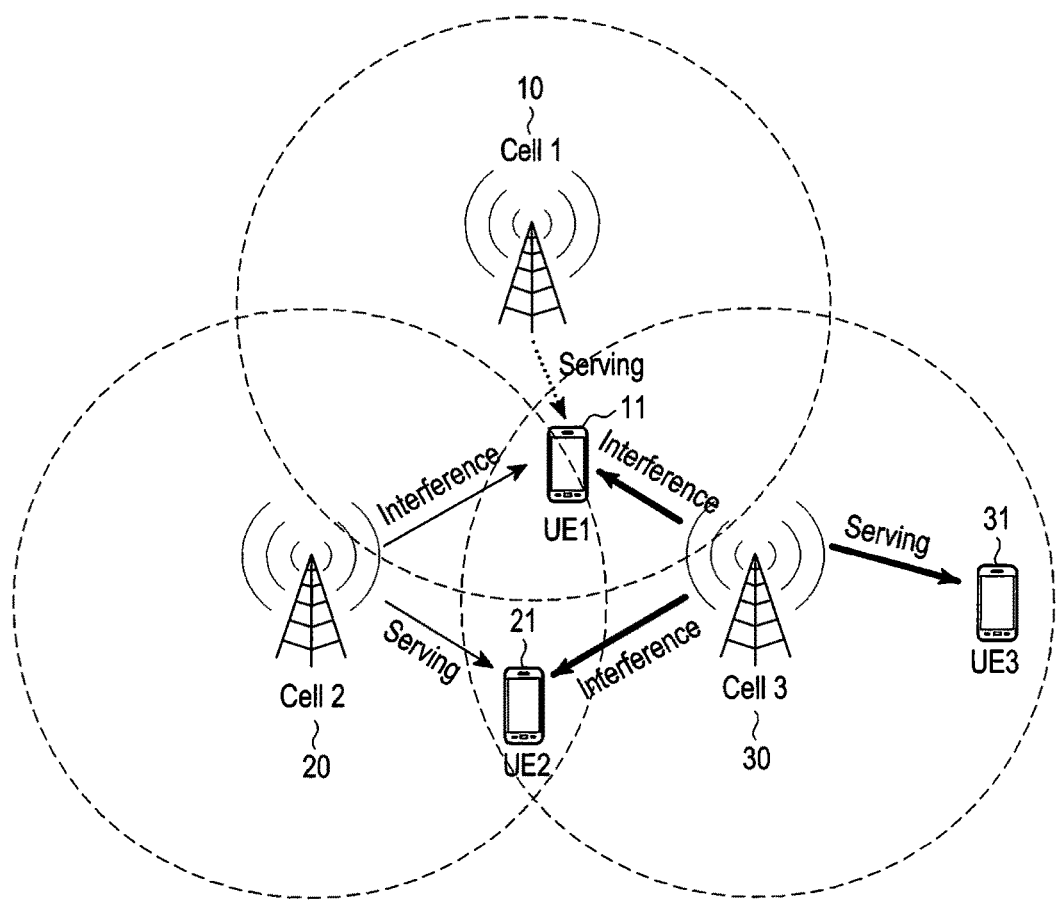
FIG. 1 is a diagram of a wireless communication system according to an embodiment of the present disclosure.

Hereinafter, embodiments of the present disclosure are described in detail with reference to the accompanying drawings. The same reference designators may be used to refer to the same or similar elements throughout the present disclosure and the accompanying drawings. When a detailed description of known functions or configurations would render the present disclosure unclear, the detailed descriptions of known functions or configurations are omitted.

The terms used herein should not be interpreted as limited as typical ones or ones defined in a dictionary but rather to comply with the technical spirit of the present disclosure based on the doctrine that the present disclosure may define terms in a manner so as to make the present disclosure understood in a way to best describe the present disclosure.

The terms as used herein are provided merely to describe embodiments thereof, but not to limit the present disclosure. It is to be understood that the singular forms "a," "an," and "the" include plural references unless the context clearly dictates otherwise. It will be further understood that the terms "comprise" and/or "have," when used in the present disclosure, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meanings as commonly understood by one of ordinary skill in the art to which the embodiments of the present disclosure belong. It will be further understood that terms, such as those defined in commonly used dictionaries, should be interpreted as having meanings that are consistent with their meanings in the context of the relevant art and will not be interpreted in an idealized or overly formal sense unless expressly so defined herein.

It should be appreciated that embodiments of the present disclosure may be applicable to various communication systems including, but not limited to, long-term evolution (LTE) wireless communication systems, long-term evolution-advanced (LTE-A) wireless communication systems, high speed downlink packet access (HSDPA) wireless communication systems, high speed uplink packet access (HSUPA) wireless communication systems, $3^{rd}$ generation project partnership 2 (3GPP2) high rate packet data (HRPD) wireless communication systems, wideband code division multiple access (WCDMA) wireless communication systems, code division multiple access (CDMA) wireless communication systems, Institute of Electrical and Electronics Engineers (IEEE) 802.16m communication systems, evolved packet systems (EPSs), and mobile internet protocol (mobile IP) systems.

As used herein, the UE may be a personal digital assistant (PDA), a smartphone, a mobile phone, a tablet computer, or a laptop computer that has communication capability, as an example.

In a wireless communication system, a modem, upon power-on, estimates and corrects transmission timing offset information and frequency offset information on a received signal through initial synchronization. Further, the modem collects and selects cell identification information through cell search (e.g. cell searcher). Thereafter, the modem receives information on a selected serving cell and continues to measure signal strengths of the cell and neighbor cells. After such a series of processes, the modem attempts cell connection.

In an LTE system, a UE may receive a primary synchronization channel (P-SCH) and a secondary synchronization channel (S-SCH) from a base station to synchronize with the base station and may obtain information such as a cell identifier (ID). Thereafter, the UE may obtain intra-cell broadcast information by receiving a physical broadcast channel from the base station. Meanwhile, the UE may identify a downlink channel status by receiving a downlink reference signal (DL RS) in an initial cell search stage. In the LTE system, cell search processes are repeatedly performed in the same way.

After completing the initial cell search, the UE may obtain more system information by receiving a physical downlink control channel (PDCCH) and a physical downlink shared channel (PDSCH) as per information carried on the PDCCH.

Further, after cell connection, the UE measures a delay spread and a Doppler frequency corresponding to a statistical characteristic of a radio channel and a signal-to-noise ratio (SNR) related to signal quality to enhance reception capability. As such, the modem itself may store and manage various synchronization and measurement information including cell information. However, if the modem is turned off or switched to an idle mode, the information is mostly initialized (e.g. erased). Further, in order to reenter into a connected mode, the modem goes through the above-described processes each time and ends up with an operation delay. Particularly in a dense cell area, inter-cell interference is highly likely to incur a delay in time for synchronization and cell search along with less reliable measurement information, and thus, a prolonged measurement time may be required. Also, in poor communication environments such as cell shadow areas, areas where relays are not normally installed, areas where base station equipment exhibit poor performance, or unstable network areas, a conventional modem fails to respond to such circumstances and repeatedly experiences the same error or failure.

The time required for the modem's repeated operation and the reliability of measurement information are directly associated with the modem's performance.

Accordingly, according to the present disclosure, a modem may separately store various operation-related information (e.g., information for controlling the modem) that the modem has gone through and manage the information in a database, and offers the modem control information before reaching a particular time or location, thus leading to a reduction in the overall time loss and an increase in measurement reliability. By dong so, the transmitter and receiver may have enhanced performance. In this case, the various operation-related information the modem has gone through includes, e.g., cell information as per the spatial location of the UE, transmission/reception signal strength and frequency offset per cell, various radio channel measurement information, degree of interference over time, optimal transmission signal strength, and timing information.

According to the present disclosure, the modem control information may be classified according to the UE's spatial location information and temporal information, stored in a memory, and managed in a database.

According to an embodiment of the present disclosure, there is provided a method in which the information managed in a database by a UE is transferred to an external central management server (CMS), and is shared with other UE modems and updated. In this case, the CMS may be a server established by a service provider and a server of the manufacturer of the UE/modem. According to an embodiment of the present disclosure, a method is provided for obtaining, through a separate database, modem control information necessary to control the modem by the UE.

According to an embodiment of the present disclosure, there is provided an example of a method for controlling a modem when a database is established in a UE. In other words, according to an embodiment of the present disclosure, there is proposed a method for obtaining, through the database in the UE, modem control information necessary to control the modem by the UE.

According to an embodiment of the present disclosure, all of the information managed in the database may be periodically transmitted in advance considering the location and reference time of the UE. The modem may minimize the time loss that may occur due to the repetitive operations through the information, and the modem may increase the reliability of various measured values and reception performance by utilizing information on inter-cell interference. Further, even when the UE's performance is deteriorated or the UE malfunctions due to the ambient geographical environment or special communication circumstances, information on a scheme for dealing with the situations may be previously received to reduce errors, thus contributing to an enhancement in the UE's performance.

In other words, according to an embodiment of the present disclosure, various operation-related information that the modem has experienced, such as, e.g., cell information as per the spatial location of the UE, transmission/reception signal strength and frequency offset per cell, various radio channel measurement information, interference over time, optimal transmission signal strength, and timing information, may be stored in a separate memory and may be managed in a database so that information for enhancing performance may be provided before arriving at a particular location or time.

If the memory is located in the modem, the database may only apply to the modem. However, if the database is managed in an integrated manner, the information may be shared with other modems.

Hereinafter, embodiments of the present disclosure are described in detail.

FIG. 1 is a diagram of a wireless communication system according to an embodiment of the present disclosure.

Referring to FIG. 1, the wireless communication system includes three neighboring cells, i.e., Cell 1 10, Cell 2 20, and Cell 3 30 and three UEs respectively connected with the cells, i.e., UE1 11, UE2 21, and UE3 31.

Among the three UEs, UE3 31 is connected with Cell 3 30 without interference. However, UE2 21 connected with Cell 2 20 is interfered with by the neighboring Cell 3 30, and UE1 11 connected with Cell 1 10 is interfered with by the neighboring Cell 2 20 and Cell 3 30.

FIG. 1 illustrates that a cellular-based wireless communication system may have an interference circumstance that varies according to the location of a UE.

In FIG. 1, UE1 11 and UE2 21 estimate interference of control signals or data traffic signals at a cell boundary and remove the interference. In this case, UE1 11 and UE2 21 measure their coordinate information to obtain location information (e.g. modem control information). Whether interference is large or small according to the obtained location information may be determined through FIG. 1.

According to an embodiment of the present disclosure, the obtained location information transferred to the CMS is managed in an SDB and is used to control the modem based on a priority of modem control information updated by the CMS.

According to an embodiment of the present disclosure, the obtained location information is stored and managed in the UE's individual database (IDB) and is used to control the modem based on a priority of updated modem control information.

Figure 2:
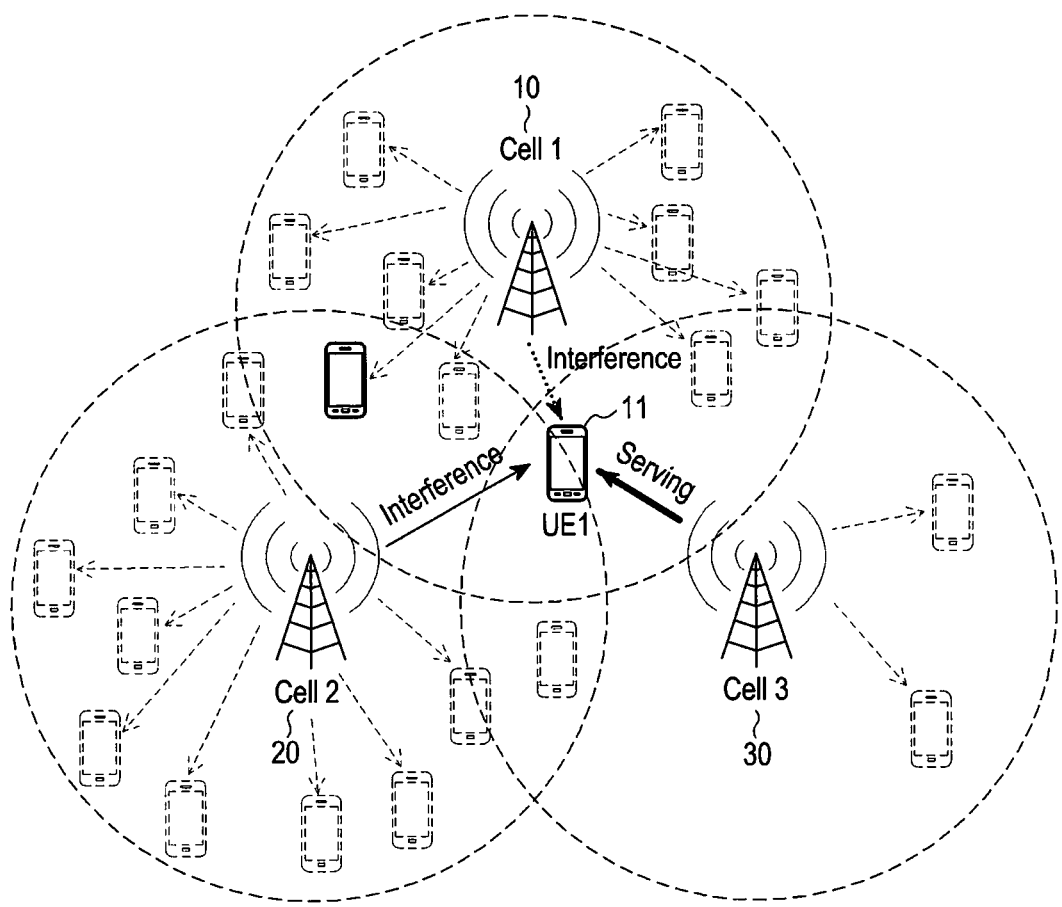
FIG. 2 is a diagram of a wireless communication system according to an embodiment of the present disclosure.

FIG. 2 is a diagram of a wireless communication system according to an embodiment of the present disclosure.

Referring to FIG. 2, UE1 11 located at the same position as that of FIG. 1 is connected with Cell 3 30, not Cell 1 10 in a certain time period. Because the data transmission traffic of Cell 1 10 and Cell 20 has increased, it is more advantageous for UE1 11 to connect to Cell 3 30.

In the cellular-based wireless communication system of FIG. 2, inter-cell traffic and interference circumstance may vary depending on the time.

UE1 11 of FIG. 2 estimates interference of control signals or data traffic signals at a cell boundary and removes the interference. In this case, UE1 11 and UE2 21 measure certain times to obtain time information (e.g. modem control information). Whether interference is large or small according to the obtained time information may be determined through FIG. 2.

According to an embodiment of the present disclosure, the obtained time information transferred to the CMS is managed in a shared database (SDB), and is used to control the modem based on priority of modem control information updated by the CMS.

According to an embodiment of the present disclosure, the obtained time information is stored and managed in the UE's own IDB and is used to control the modem based on priority of updated modem control information.

According to an embodiment of the present disclosure, if information on the interference circumstance as described in connection with FIGS. 1 and 2 is previously obtained, the modem adaptive time for interference may be reduced, and performance may be enhanced.

Figure 3A:
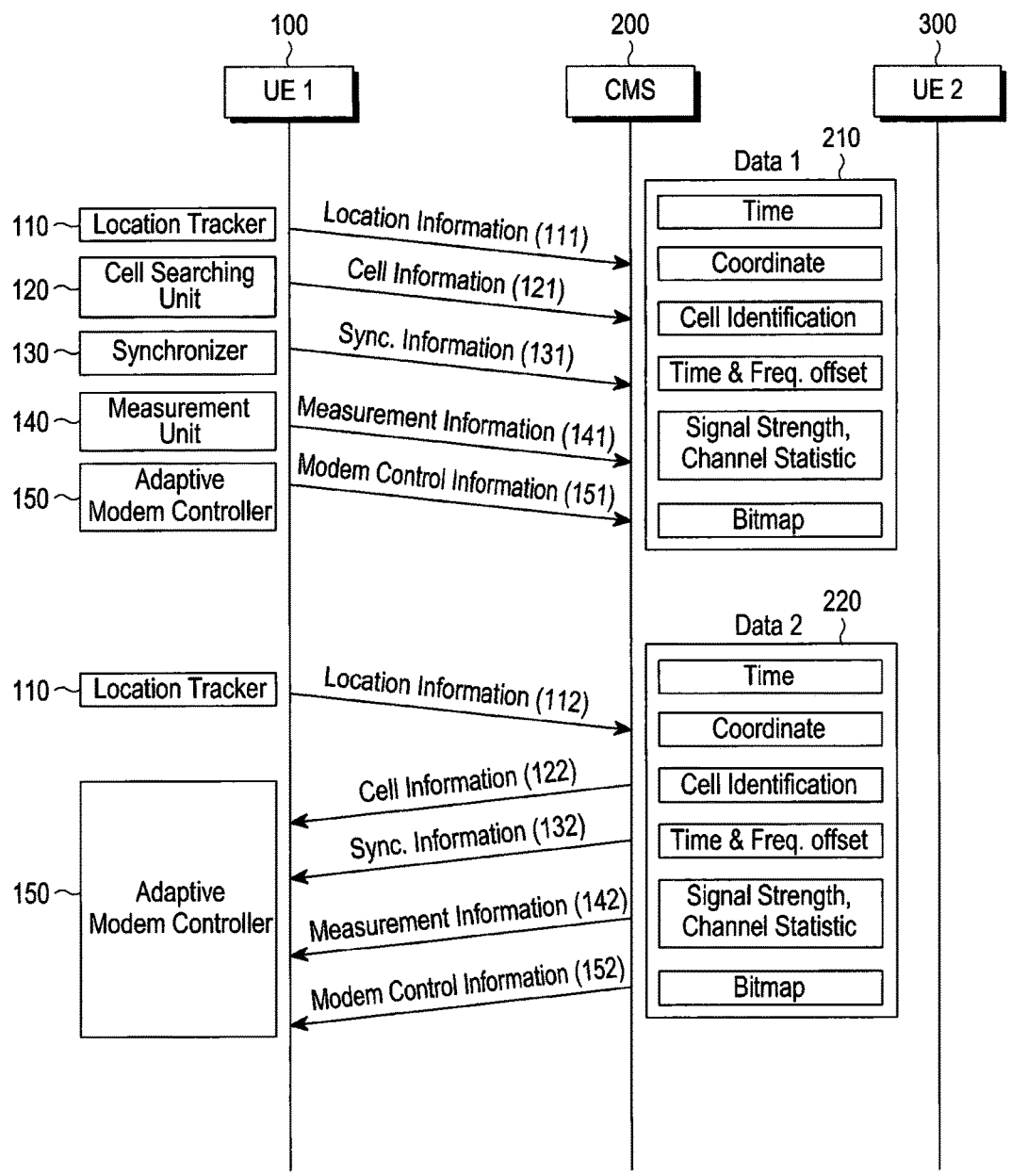
FIGS. 3A and 3B are flowcharts of methods of collecting information and controlling a modem based on a database according to embodiments of the present disclosure.
Figure 3B:
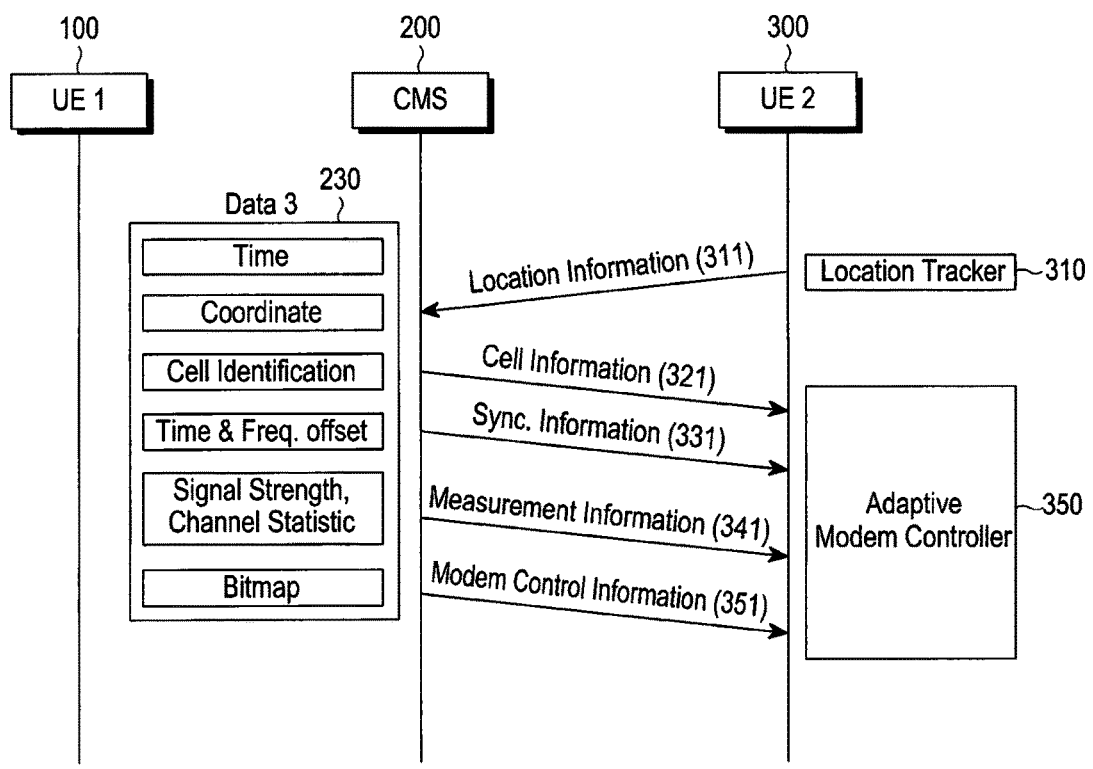

FIGS. 3A and 3B are flowcharts of methods of collecting information and controlling a modem based on a database according to embodiments of the present disclosure.

The flowcharts of FIGS. 3A and 3B show examples in which modem control information collected through UEs are managed in a database that is then put to use.

Data 1 210, Data 2 220, and Data 3 230 described below are implemented in the form of a database.

First, information provided from UE1 100 is stored in Data 1 210 in a CMS 200 as follows. The location information 111 of the UE1 100 by a location tracker 110 is stored in Data 1 210 in the form of a coordinate value.

Cell information 121 by a cell searching unit 120 is stored in Data 1 210 in the form of a cell identification (cell ID).

Various synchronization information 131 by a synchronizer 130 is stored in Data 1 210 in the form of a timing offset and frequency offset.

Various measurement information 141 by a measurement unit 140 is stored in Data 1 210 in the form of a signal strength and statistical characteristic value of a channel.

Other modem control information 151 by an adaptive modem controller 150 is stored in Data 1 210 in the form of a bitmap. In this case, corresponding time information is simultaneously stored in Data 1 210.

Information provided by UE1 100 further includes a channel estimator control parameter provided by a channel estimator and a demodulator control parameter provided by a demodulator.

Then, UE1 100 may use the information managed in the database as follows.

The CMS 200, upon reception of location information 112 on a new location of UE1 100 which is obtained by the location tracker 110, transmits information stored in Data 2 220 to UE1 100 based on statistical material on the corresponding time. The information in Data 2 220 includes a cell identification that is cell information 122, a time and frequency offset that is synchronization information 132, a signal strength and statistical characteristic value of a channel that is measurement information 142, and modem control information 152.

The adaptive modem controller 150 reduces the time of the operation of the cell searching unit 120, synchronizer 130, and measurement unit 140 and enhances measurement performance based on the cell information 122, the synchronization information 132, the measurement information 142, and the modem control information 152.

In addition, another UE, UE2 300, if transmitting location information 311 obtained from the location tracker 310 to the CMS 200 in FIG. 3B, may share information in Data 3 230 in the same manner. In this case, the information in Data 3 230 includes a cell identification that is cell information 321, a time and frequency offset that is synchronization information 331, a signal strength and statistical characteristic value of a channel that is measurement information 341, and modem control information 351.

The adaptive modem controller 350 serves to reduce the time of the operation of the cell searching unit, synchronizer, and measuring unit in UE2 300 and enhance measurement performance based on the cell information 321, synchronization 331, measurement information 341, and modem control information 351.

The databases shown in FIGS. 3A and 3B Data 1 210, Data 2 220, and Data 3 230, by way of example, include information on uplink signals as well as information on downlink signals. For example, information on uplink signals includes an optimal transmission timing of an uplink signal, optimal signal strength, and frequency offset information on a serving cell base station.

The location trackers 110 and 310 shown in FIGS. 3A and 3B may each be implemented as a global positioning system (GPS) or an observed time difference of arrival (OTDOA) estimator. Further, the location trackers 110 and 310 provide location information that may include a time, a speed, a distance and/or a direction of the modem. The location information includes a location such as a latitude and longitude coordinate in association with the time, direction, and/or speed of the modem at a certain position.

Figure 4:
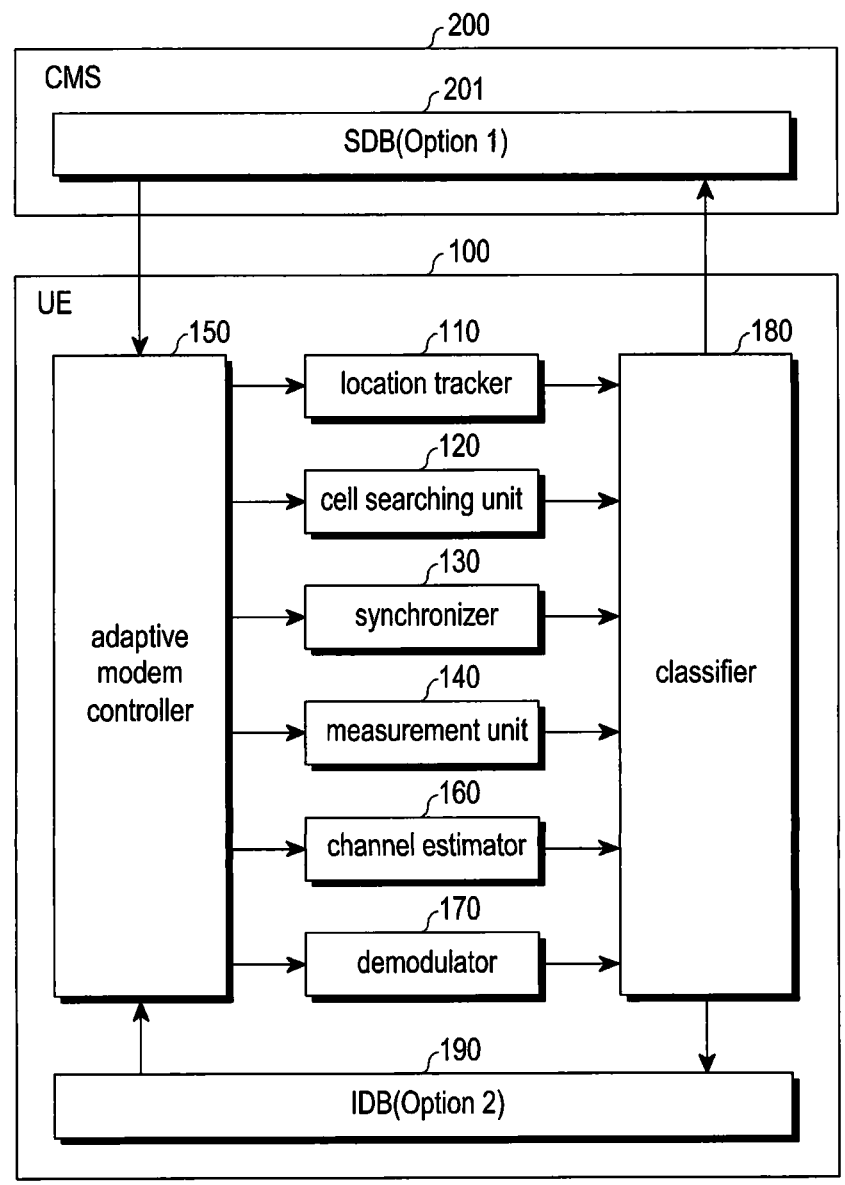
FIG. 4 is a block diagram of an interface between a user equipment (UE) modem and a database according to an embodiment of the present disclosure.

FIG. 4 is a block diagram of an interface between a UE modem and a database according to an embodiment of the present disclosure.

The location tracker 110 tracks location information 111 of the UE in the form of a coordinate value. The cell searching unit 120 searches cell information 121 in the form of a cell identification (e.g. cell ID).

The synchronizer 130 manages and/or processes various synchronization information 131 in the form of a timing offset and a frequency offset.

The measuring unit 140 measures and/or manages measurement information 141 in the form of a signal strength and statistical characteristic value of a channel.

Referring to FIG. 4, the information described in connection with FIGS. 3A and 3B by way of example may be managed in an individual database (IDB) 190 as well as in a shared database (SDB) 201 through the CMS 200. That is, the adaptive modem controller 150 receives information necessary for the location tracker 110, cell searching unit 120, synchronizer 130, measuring unit 140, channel estimator 160, and demodulator 170 from the SDB 201 as in an embodiment of the present disclosure or from the IDB 190 as in another embodiment of the present disclosure and controls the location tracker 110, the cell searching unit 120, the synchronizer 130, the measuring unit 140, the channel estimator 160, and the demodulator 170. Further, a classifier 180 converts values respectively output from the location tracker 110, the cell searching unit 120, the synchronizer 130, the measuring unit 140, the channel estimator 160, and the demodulator 170 or values necessary for controlling an operation to group data and transfers the grouped data to the SDB 201 or IDB 190. In this case, the modem control information 151 necessary for controlling an operation includes information for controlling the channel estimator 160 and the demodulator 170.

Figure 5:
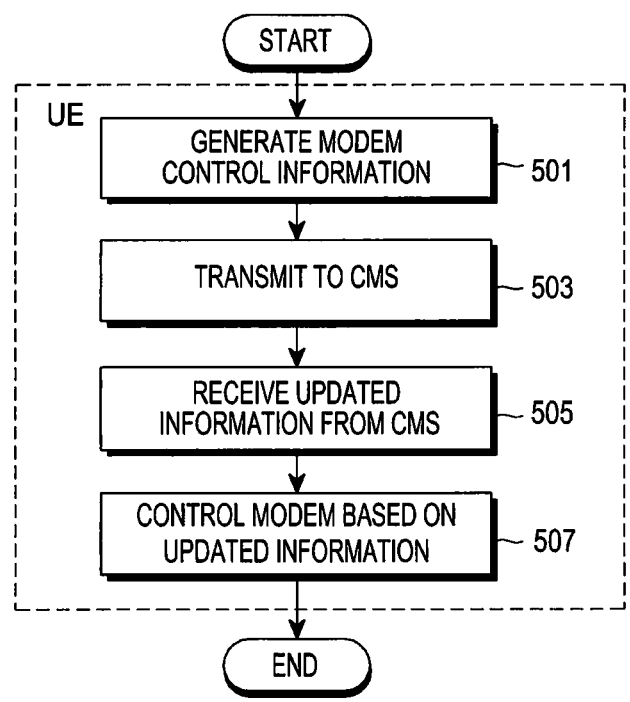
FIG. 5 is a flowchart of a method of a UE according to an embodiment of the present disclosure.

FIG. 5 is a flowchart of a method of a UE according to an embodiment of the present disclosure.

According to an embodiment of the present disclosure, there is provided an example of a method in which the information managed in the database is transferred by the UE to a CMS positioned external to the UE, and is shared with other UE modems and updated.

The UE generates modem control information in step 501. In this case, the modem control information includes, e.g., the location information 111, the cell information 121, the synchronization information 131, the measurement information 141, and the modem control information 151 as shown in FIG. 3A. According to the present disclosure, the modem control information may be used in a combination thereof.

The UE transmits the generated modem control information to the CMS in step 503.

Thereafter, the UE receives updated information from the CMS in step 505.

According to the present disclosure, the updated information may include new location information, new time information, and radio communication environment information. Additionally, according to the present disclosure, the updated information may include information other than the new location information, new time information, and radio communication environment information.

Figure 6:
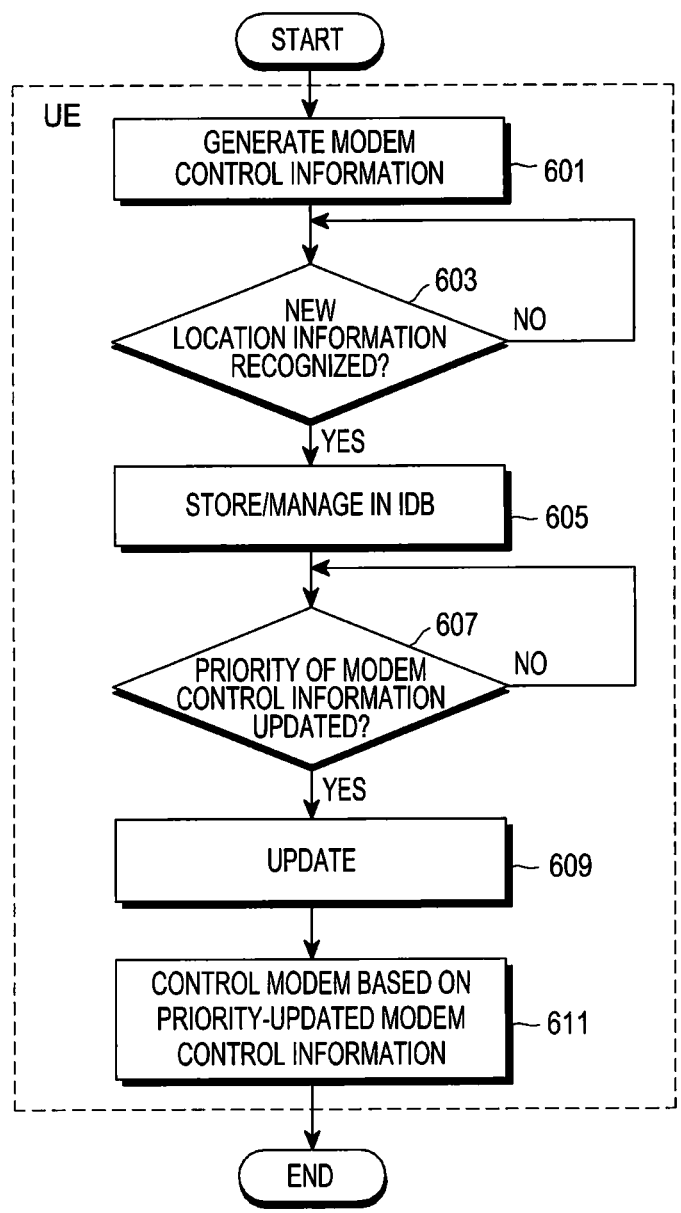
FIG. 6 is a flowchart of a method of a UE according to an embodiment of the present disclosure.

FIG. 6 is a flowchart of a method of a UE according to an embodiment of the present disclosure.

According to an embodiment of the present disclosure, there is provided an example of a method for controlling a modem when a database is established in a UE.

The UE generates modem control information in step 601. In this case, the modem control information includes, e.g., the location information 111, the cell information 121, the synchronization information 131, the measurement information 141, and other modem control information 151 as shown in FIG. 3A. According to the present disclosure, the modem control information may be used in a combination thereof.

The UE determines, based on the received modem control information, whether certain information (e.g., new location information) has been recognized and/or generated in step 603. If the new location information is not recognized and/or generated, the information is not separately stored or managed. However, if the new location information is recognized and/or generated, the UE stores and/or manages the new location information in an IDB in step 605.

Thereafter, the UE determines whether to update the priority of the modem control information of the UE in step 607.

If it is not required to update the priority of the modem control information of the UE, the UE waits until the priority must be updated (e.g. waits with a lower priority). However, if the priority of the modem control information of the UE must be updated, the UE updates the priority of the stored modem control information of the UE in step 609.

Thereafter, the UE controls the modem based on the priority-updated modem control information in step 611.

Modem control information that is not used any longer or has a low frequency of use may be deleted under various conditions.

Figure 7:
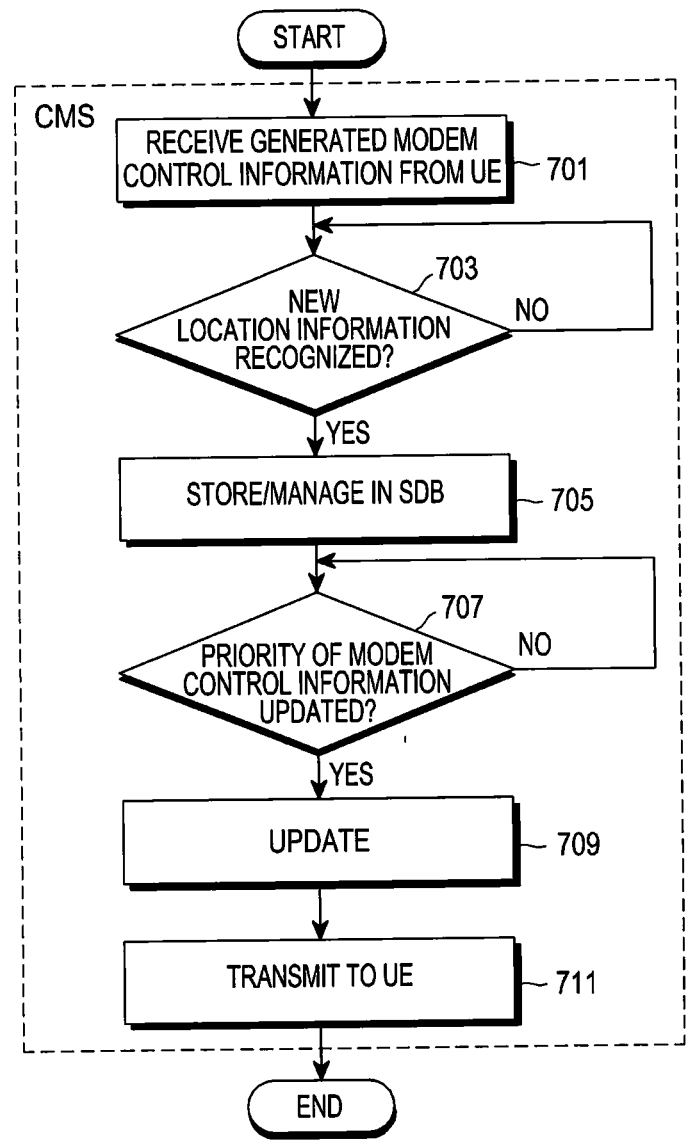
FIG. 7 is a flowchart of a method of a central management server (CMS) according to an embodiment of the present disclosure.

FIG. 7 is a flowchart of a method of a central management server (CMS) according to an embodiment of the present disclosure.

Referring to FIG. 7, the CMS receives generated modem control information from the UE in step 701.

The CMS determines, based on the received modem control information, whether certain information (e.g., new location information) has been recognized in step 703. If the new location information is not recognized, the CMS does not separately store or manage the information.

However, if the new location information is recognized, the CMS stores and/or manages the new location information in an SDB in step 705.

Thereafter, the CMS determines whether to update the priority of the modem control information of the UE stored in the SDB in step 707.

If the priority of the modem control information of the UE need not be updated, the CMS waits until the priority of the modem control information of the UE must be updated. However, if the priority of the modem control information of the UE must be updated, the CMS updates the priority of the stored modem control information of the UE in step 709.

Thereafter, the CMS transmits the priority-updated modem control information to the UE in step 711.

Modem control information that is not used any longer or has a low frequency of use may be deleted under various conditions.

FIG. 8 is an illustration of a database according to an embodiment of the present disclosure.

According to an embodiment of the present disclosure, the database 800 is an example of group 37, for example.

For example, the database 800 includes a "0" indicating "location," a "1" indicating "person," a "10" indicating "signal strength," a "13" indicating "signal-to-noise ratio (SNR)," a "14" indicating "signal-to-interference ratio (SIR)," a "20" indicating "maximum delayed path," a "21" indicating "Doppler frequency," a "22" indicating "initial time offset," a "23" indicating "initial frequency offset," a "24" indicating "channel state index," a "30" indicating "synchronizer control parameter 0," a "31" indicating "synchronizer control parameter 1," a "32" indicating "synchronizer control parameter 2," a "40" indicating "channel estimator control parameter 0," a "41" indicating "channel estimator control parameter 1," a "42" indicating "channel estimator control parameter 2," a "50" indicating "demodulator control parameter 0," a "51" "demodulator control parameter 1," a "52" indicating "demodulator control parameter 2," a "60" indicating "other control parameter 0," a "61" indicating "other control parameter 1," and "62" indicating "other control parameter 2."

According to the present disclosure, the modem control information stored in the database may be used in a combination thereof.

According to an embodiment of the present disclosure, information may be shared between UEs through a dedicated application of the service provider or a UE. That is, according to an embodiment of the present disclosure, a certain application of a UE may be executed to communicate the UE's location information 111, cell information 121, synchronization information 131, various measurement information 141, and other modem control information 151, as shown in FIGS. 3A and 3B.

If the certain application is executed on the UE, at least one parameter related to the operation of the UE is generated, and the at least one parameter is transmitted to the CMS. Thereafter, the CMS determines based on the information in the SDB whether the priority of the modem control information of the UE must be updated, and, if the update is needed, transmits priority-updated modem control information to the UE. Thereafter, the UE controls the modem based on the priority-updated modem control information. The at least one parameter includes at least one of cell information as per the location of the UE, per-cell transmission/reception signal strength, frequency offset, radio channel measurement information, information on the interference over time, optimal transmission signal strength, and optimal transmission time information.

Figure 9:
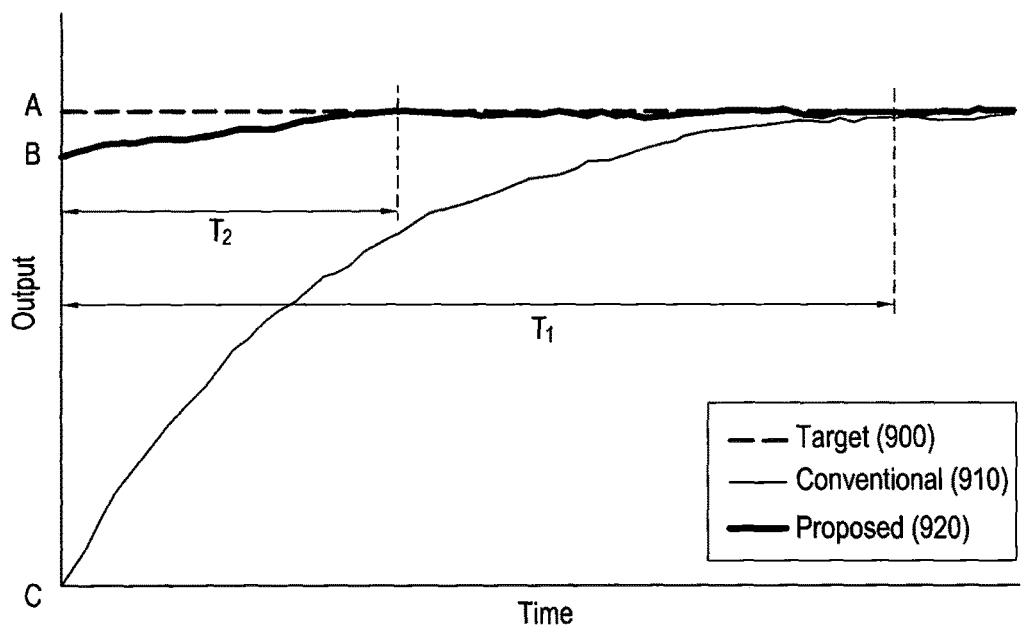
FIG. 9 is a graph comparing serving cell frequency offset estimation performance according to an embodiment of the present disclosure.

FIG. 9 is a graph comparing serving cell frequency offset estimation performance according to an embodiment of the present disclosure.

FIG. 9 illustrates a conventional estimated performance (e.g., Conventional) 910 and an estimated performance (e.g., Proposed) 920 according to the present disclosure, for a serving cell frequency offset target (e.g., Target A) 900 that is targeted by the modem of the UE. The frequency offset estimator (or synchronizer) mostly passes through an infinite impulse response (IIR) filter to enhance jitter performance. The conventional frequency offset estimator (or synchronizer) performs gradual tracking starting with an initial value, C, in order to estimate the target value A. In this case, C is mostly set to 0, and the overall convergent time $T_1$ is taken.

In addition, according to the present disclosure, the adaptive modem controller 150 sets an initial value using a serving cell frequency offset B obtained from the database and passed through the IIR filter. Accordingly, the overall convergent time $T_2$ is taken, leading to a reduction in time by $T_1$-$T_2$ as compared with the conventional estimator.

Figure 10:
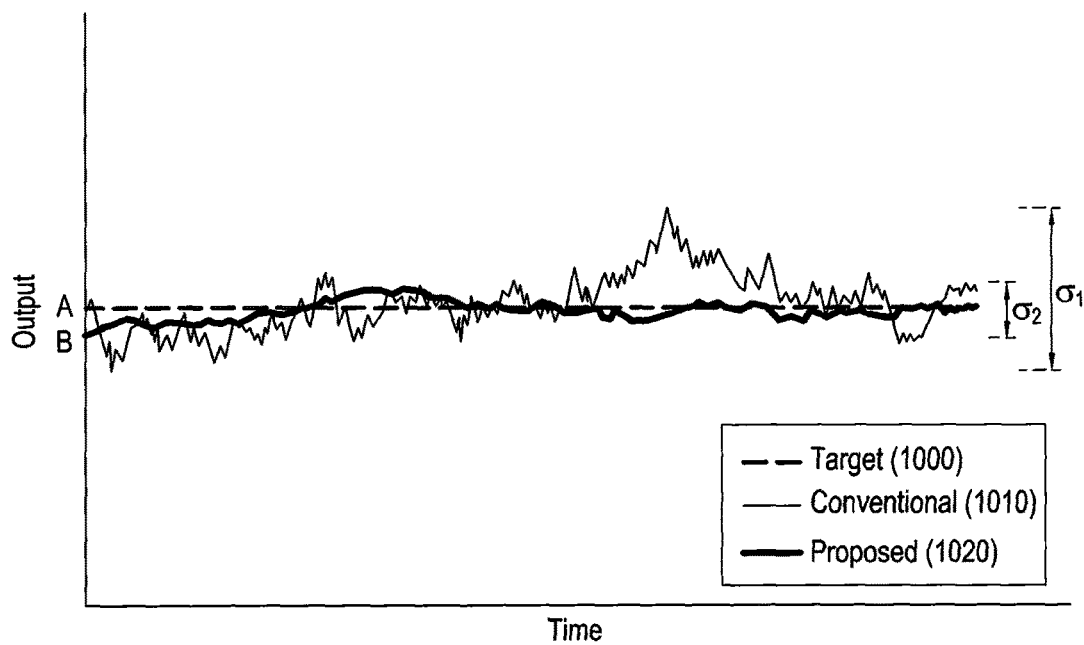
FIG. 10 is a graph comparing interfering cell frequency offset estimation performance according to an embodiment of the present disclosure.

FIG. 10 is a graph comparing interfering cell frequency offset estimation performance according to an embodiment of the present disclosure.

FIG. 10 illustrates a conventional estimated performance (e.g., Conventional) 1010 and an estimated performance (e.g., Proposed) 1020 according to the present disclosure, for an interfering cell frequency offset target (e.g. Target A) 1000 that is targeted by the modem of the UE.

While FIG. 9 shows the tracking performance for a transient state, FIG. 10 shows the jitter performance for a steady state. If there is an interfering cell, signals from the serving cell may interfere with the process of estimating a frequency offset for the interfering cell, thus deteriorating the estimation accuracy of the corresponding frequency offset. Accordingly, the steady state jitter performance becomes a more critical index rather than the overall convergent time. Generally, as the coefficient of the IIR filter increases, the convergent time reduces, and the steady-state jitter performance is deteriorated. On the contrary, as the coefficient of the IIR filter decreases, the convergent time increases, but the steady-state jitter performance is enhanced. That is, the convergent time and the jitter performance are inversely related. Accordingly, it may not be too beneficial to reduce the filter's coefficient only for a better steady-state jitter performance for the conventional estimator. However, the adaptive modem controller 150 according to the present disclosure may adopt, as an initial value, the interfering cell frequency offset, B, obtained from the database, and the adaptive modem controller 150 may enhance the steady-state jitter performance with the overall convergent time reduced. While the conventional estimated jitter value is $\sigma_1$, the jitter value according to the present disclosure is $\sigma_2$, and thus the error may be reduced by $\sigma_1$-$\sigma_2$.

Various information obtained from the database may enhance the modem's performance through the adaptive modem controller 150 in various manners in addition to the frequency offset estimating scheme proposed in connection with FIGS. 9 and 10. For example, the cell information (or cell identification information) may shorten the time required for search of neighboring cells, and the signal strength information as per location may reduce the frequency of handover, leading to a minimized time loss and enhancement in the overall data transmission rate. Further, the optimal time information and frequency offset information for uplink transmission may enhance the reception performance of a base station, allowing for an enhancement in uplink data transmission rate and minimized deterioration of downlink performance that may occur due to an automatic repeat request (ARQ) response failure. The statistical characteristic information of radio channel such as Doppler frequency and delay spread may reduce convergent time as per estimation and increase estimation accuracy. The performance of the channel estimator requiring each estimation value may also be enhanced. As such, all of the information necessary for the operation of the modem may exhibit better effects in the cell dense area with severe neighboring cell interference.

Further, if there is a cell shadow area where the UE nearly cannot communicate, the UE may be previously given a way to deal with the UE entering the shadow zone. By way of example, if the channel state information is adjusted and a low-quality state is previously notified, the base station may vary the transmission mode (TM) or reduce the modulation and code rate (MCS) so that signals may be transmitted to be easily received. The UE may also quickly shift its communication scheme from 4G LTE to wireless fidelity (Wi-Fi) or 3G high speed downlink packet access (HSDPA) through the previous information on the shadow area to thus reduce unnecessary frequent attempts to access the cell and minimize power consumption.

The UE may previously handle a lowering in signal quality that occurs due to inter-symbol interference (ISI) from multi-path channel delay or a deterioration of signal quality due to timing synchronization errors that may arise if a relay is located around the UE and the transmission timing delay of the relay relative to the macro cell is abnormally high. As an example, from a timing synchronization perspective, if the UE is previously aware of the statistical characteristics on the relay's channel path, a frequent variation in transmission timing synchronization may be prevented, and the UE, if able to eliminate ISI, may determine whether to remove ISI more quickly and in a more accurate manner.

Such an abnormal event occurring in the measured SNR where although the SNR is not low, the reception performance is decreased or drastic reductions in SNR are repeated in constant periods, the information may be delivered to the database, and if the database has a similar pattern of the event, control information as to how to deal with such an event may be known to the UE.

If the communication environment is poor due to, e.g., use of low performance base station equipment or an unstable network, information on how the UE may treat the environment may be sent to the UE in advance, allowing the UE to make a quick measurement.

The UE may collect the information through the IDB and update the per-type measurements. For example, the UE may store all of the information determined to be managed in the database at predetermined time intervals, and upon detecting a communication circumstance similar in type to a predetermined certain communication environment, may be implemented to execute, one by one, the predefined modem control scheme items in a predetermined order.

If the performance for a selected control scheme fails to meet a particular condition, the control scheme may be adjusted to, e.g., have a lower priority in execution. The present disclosure may be implemented through a separate storage device managing a database and a separate device for interpreting information stored in the database and determining set values that enable control of the modem per communication circumstance or per type. Further, the set values may be transferred to the adaptive modem controller in the modem so that registers or registry values may be directly varied, and may control other devices in the modem through separate commands.

Further, the information may be managed in an SDB by the CMS to enable update of per-type measurements. For example, the UE may be implemented to transmit information determined to be managed in the database to the CMS at predetermined time intervals, and the CMS, upon detecting a communication circumstance similar in type to a predetermined certain communication environment, may be implemented to transmit a resultant final measurement to the UE to allow the UE to quickly control the modem. As another example, the UE may be limited to transmit the information to the CMS only under predetermined certain circumstances in order to reduce the volume of data transmission. As such, if the database is managed by the CMS, various empirical information from a number of UEs may be collected.

Another scheme is to allow the UE to periodically receive and update modem control schemes regarding measurements and certain communication environments from the CMS. As such, all of the information managed in the database may be periodically transferred considering the location and reference time of the UE, and the information may include a wide range of information on an area around the location of the UE and a particular time range. Further, the method for collecting and transferring the information managed in the database may be established in a communication standard, but may also be provided to the UE regardless of communication standards. Accordingly, the present disclosure may be differentiated in the form of offering the database to only UEs subscribing to a particular service or a particular product, and accordingly, the modem may become highly competitive.

According to an embodiment of the present invention, in the method for controlling the UE, the wireless communication environment may include at least one of time information, position information on the UE, cell identity information corresponding to the UE, per-cell signal strength, frequency offset, timing offset, channel state information (CSI), interference information, and downlink configuration information.

According to an embodiment of the present invention, the method for controlling the UE may further include receiving information related to the changed wireless communication environment from the UE by the central management server.

According to an embodiment of the present invention, the method for controlling the UE may further include updating the priority of the modem control information based on the information related to the changed wireless communication environment by the central management server.

According to an embodiment of the present invention, in the method for controlling the UE, updating the priority of the modem control information by the central management server may include overriding (e.g., change to a top priority) first modem information stored in the database with second modem control information corresponding to the changed wireless communication environment.

According to an embodiment of the present invention, in the method for controlling the UE, the database may store the first modem control information and the second modem control information.

According to an embodiment of the present invention, in the method for controlling the UE, the modem control information includes at least one of a parameter for controlling a modulator/demodulator modulating or demodulating a received signal, a parameter for controlling a channel estimator (e.g., finite impulse response (FIR)/infinite impulse response (IIR) filter coefficient), and a parameter for performing sync with a base station.

According to an embodiment of the present invention, an apparatus for controlling a modem of a user equipment (UE) in a wireless communication system may include a transceiver transmitting information related to a wireless communication environment changed for the UE to a central management server and receiving modem control information corresponding to a priority updated according to the change in the wireless communication environment from the central management server and a processor controlling the modem of the UE using the updated modem control information, wherein the received, priority-updated modem control information is, when at least a portion of the wireless communication environment is changed, priority-updated information according to the changed wireless communication environment.

According to an embodiment of the present invention, the received, priority-updated modem control information may be, when at least a portion of the wireless communication environment is changed, priority-updated information according to the changed wireless communication environment.

According to an embodiment of the present invention, the processor may control the central management server to receive information related to the changed wireless communication environment from the UE.

A method and apparatus for controlling a modem in a wireless communication system according to an embodiment of the present disclosure may be implemented in hardware, software, or a combination of hardware and software. Such software may be stored in a volatile or non-volatile storage device such as a read-only memory (ROM) or other storage devices, a memory, such as a random access memory (RAM), a memory integrated circuit or chip, a device or an integrated circuit, or a storage medium, such as, e.g., a compact disk (CD), a digital video disk (DVD), a magnetic disk, or a magnetic tape, which allows for optical or magnetic recording while simultaneously being read by a machine (e.g., a computer). A method for controlling a modem in a wireless communication system according to an embodiment of the present disclosure may be implemented by a computer or a portable terminal including a controller and a memory, and the memory may be an example of a storage medium that may be read by a machine appropriate for storing a program or programs including instructions for realizing the embodiments of the present disclosure.

Accordingly, the present disclosure encompasses a program containing code for implementing the device or method set forth in the claims of this disclosure and a non-transitory machine (e.g., computer)-readable storage medium storing the program. The program may be electronically transferred via any media such as communication signals transmitted through a wired or wireless connection, and the present disclosure includes the equivalents thereof.

A controller of an apparatus for controlling a modem in a wireless communication system according to an embodiment of the present disclosure may receive the program from a program providing device wiredly or wirelessly connected thereto and store the same. The program providing device may include a memory for storing a program including instructions to enable the program processing device to perform a method for controlling a modem in a predetermined wireless communication system and information necessary for the method for controlling the modem in the wireless communication system, a communication unit for performing wired or wireless communication with the program processing device, and a controller transmitting the program to the communication device automatically or at the request of the program processing device.

Although certain embodiments of the present disclosure have been described above, various changes may be made thereto without departing from the scope and spirit of the present disclosure. Thus, the scope of the present disclosure should not be limited to the above-described embodiments of the present disclosure, but should rather be defined by the appended claims and equivalents thereof.

What is claimed is:

1. A method for controlling a modem by a user equipment (UE) in a wireless communication system, the method comprising:
   determining whether a wireless communication environment is changed based on information related to the wireless communication environment;
   if the wireless communication environment is changed, updating a priority of modem control information for each wireless communication environment stored in the UE based on the changed wireless communication environment;
   identifying modem control information corresponding to the changed wireless communication environment based on the updated priority; and
   controlling the modem of the UE using the identified modem control information.

2. The method of claim 1, wherein the information related to the wireless communication environment comprises at least one of time information, position information on the UE, cell identity information corresponding to the UE, per-cell signal strength, frequency offset, timing offset, channel state information (CSI), interference information, and downlink configuration information.

3. The method of claim 1, wherein updating the priority of the modem control information for each wireless communication environment includes changing a priority of first modem control information, among the modem control information for each wireless communication environment, with a priority of second modem control information corresponding to the changed wireless communication environment, among the modem control information for each wireless communication environment.

4. The method of claim 1, wherein the modem control information for each wireless communication environment is classified based on at least one of time information and position information of the UE.

5. The method of claim 1, wherein the identified modem control information includes at least one of a parameter for controlling a modulator/demodulator modulating or demodulating a received signal, a parameter for controlling a channel estimator, and a parameter for performing sync with a base station.

6. A method for controlling a modem by a user equipment (UE) in a wireless communication system, the method comprising:
   transmitting information related to a changed wireless communication environment of the UE to a central management server;
   receiving modem control information corresponding to the changed wireless communication environment from the central management server; and
   controlling the modem of the UE using the received modem control information,
   wherein a priority of modem control information for each wireless communication environment stored in the central management server is updated based on the changed wireless communication environment, and
   wherein the received modem control information is identified based on the updated priority.

7. The method of claim 6, wherein the information related to the changed wireless communication environment comprises at least one of time information, position information on the UE, cell identity information corresponding to the UE, per-cell signal strength, frequency offset, timing offset, channel state information (CSI), interference information, and downlink configuration information.

8. The method of claim 6, wherein a priority of first modem control information, among the modem control information for each wireless communication environment, with a priority of the received modem control information corresponding to the changed wireless communication environment.

9. The method of claim 6, wherein the modem control information for each wireless communication environment is classified based on at least one of time information and position information of UE.

10. The method of claim 6, wherein the received modem control information includes at least one of a parameter for controlling a modulator/demodulator modulating or demodulating a received signal, a parameter for controlling a channel estimator, and a parameter for performing sync with a base station.

11. A user equipment (UE) in a wireless communication system, the UE comprising:
   a modem;
   a transceiver configured to transmit information related to a changed wireless communication environment of the UE to a central management server, and receive modem control information corresponding to changed wireless communication environment from the central management server; and
   a processor configured to control the modem using the received modem control information,
   wherein a priority of modem control information for each wireless communication environment stored in the central management server is updated based on the changed wireless communication environment, and
   wherein the received modem control information is identified based on the updated priority.

12. The UE of claim 11, wherein the information related to the changed wireless communication environment comprises at least one of time information, position information on the UE, cell identity information corresponding to the UE, per-cell signal strength, frequency offset, timing offset, channel state information (CSI), interference information, and downlink configuration information.

13. The UE of claim 11, wherein the received modem control information includes at least one of a parameter for controlling a modulator/demodulator modulating or demodulating a received signal, a parameter for controlling a channel estimator, and a parameter for performing sync with a base station.

14. The UE of claim 11, wherein a priority of first modem control information, among the modem control information for each wireless communication environment, is changed with a priority of the received modem control information corresponding to the changed wireless communication environment.

15. The UE of claim 11, wherein the modem control information for each wireless communication environment is classified based on at least one of time information and position information of the UE.

* * * * *